United States Patent [19]

Prinz

[11] Patent Number: 4,505,559
[45] Date of Patent: Mar. 19, 1985

[54] METHOD AND MEANS FOR COMPENSATING FOR IMAGE MOTION IN AN AERIAL CAMERA

[75] Inventor: Reinhard Prinz, Aalen, Fed. Rep. of Germany

[73] Assignee: Carl-Zeiss-Stiftung, Heidenheim/Brenz, Oberkochen, Fed. Rep. of Germany

[21] Appl. No.: 508,929

[22] Filed: Jun. 29, 1983

[30] Foreign Application Priority Data

Apr. 20, 1983 [DE] Fed. Rep. of Germany ....... 3314227

[51] Int. Cl.³ .............................................. G03B 39/04
[52] U.S. Cl. ......................................... 354/66; 354/71
[58] Field of Search ......................... 354/66, 71, 94, 99

[56] References Cited

U.S. PATENT DOCUMENTS 2,599,517 6/1952 Raspet .................................. 354/66

Primary Examiner—William B. Perkey
Attorney, Agent, or Firm—Hopgood, Calimafde, Kalil, Blaustein & Judlowe

[57] ABSTRACT

The invention contemplates image-motion compensation in an aerial camera in which the slot of a focal-plane shutter (11) moves in a direction transverse to the direction of film (6) transport, and in which film transport is parallel to the direction of flight. In order to compensate for the component of image-motion which is dependent on the field angle and which occurs with laterally inclined displacements of the camera, the slotted shutter (11) is coupled with an encoder (17) which in the course of making the exposure reports to a computer (12) the instantaneous field position (x) of the shutter slot. This computer (12) also determines a speed profile (A, B) in the interval between successive exposures the speed profile being derived from ground-clearance altitude h, flight velocity $V_F$, focal length f, angle of swing $\beta'$, and a basic function which is dependent on the type of lens. The computer interprets the feed back signal from the encoder (17) against the speed profile to determine a control signal to regulate the film drive (7, 8).

The single lens (5) of the camera can be replaced by a multiple-lens configuration (35), with the fields of the individual lenses in lateral overlap or adjacency to produce wide-angle coverage, in which case the single slot of a single focal-plane shutter may scan all the fields of the individual lenses in a single exposure sweep.

For the situation in which a lens or lenses must be changed for adaptation to particular requirements, the lens mounts are coded with lens data, and a code reader (41) coupled to the lens mount provides input data to the computer for selection of the corresponding basic function stored in the computer for the calculation of the speed profile (A, B).

11 Claims, 8 Drawing Figures

METHOD AND MEANS FOR COMPENSATING FOR IMAGE MOTION IN AN AERIAL CAMERA

BACKGROUND OF THE INVENTION

The present invention relates to a method and a device for compensating for image motion in an aerial camera in which the slot of a focal-plane shutter travels transverse to the direction of film transport and in which film transport is parallel to the direction of flight.

Devices to compensate for image motion, generally abbreviated "FMC" ("forward-motion compensation") or "IMC" ("image-motion compensation"), are included in aerial cameras of practically all types. They compensate by controlling relative movement between lens and film, to accord with the image-motion speed ($V_B$) of the photographed object in the film plane, which speed is described by the equation $$V_B = \frac{V_F \cdot f}{h} \qquad (1)$$

In this equation:
$V_F$ is the speed of flight
f is the focal length of the camera
h is the flight altitude or ground clearance However, the image-motion speed $V_B$ is constant over the entire image field only if the optical axis of the camera lens is perpendicular to the terrain scanned by the flight. If this prerequisite is not satisfied, for instance because the airplane has tilted out of its horizontal position to the extent of angle ω during the exposure, or because the camera (i.e., its optical axis) has been installed at a lateral inclination angle β to the vertical, then the image-motion speed $V_B$ changes within the image field as a function of the lateral extent of the field of view, viz. the field angle α.

The foregoing can be noted qualitatively from the showing in FIG. 1 of the drawings herein. In the circumstance of lateral tilt (from the vertical) of the axis of the lens 4 of an aerial camera in an airplane 3, the object plane 2 and the image plane 1 are no longer parallel to each other and, accordingly, the camera-to-subject distance and the image scale are dependent on the instantaneous field angle α. The general expression for image-motion speed $V_B$, taking roll and tilt into consideration, is given by the equation:

$$V_b = \frac{V_F \cdot f}{h} \cdot \frac{\cos(\beta' + \alpha)}{\cos} = \frac{V_F \cdot f}{h}(\cos\beta' - \sin\beta'\tan\alpha). \qquad (2)$$

which $\beta' = \omega + \beta$.

It is clear that motion blur can occur in the picture if the influence of the additional parameters $\beta'$ and α is not taken into account when designing a device for image-motion compensation (FMC).

In so-called panoramic cameras, it is known to control the FMC motion not merely as a function of the ratio $V_F/h$ but, furthermore, as a function of the swing angle γ of a prism which is arranged in front of the camera lens and which cyclically scans the terrain.

FMC systems for panoramic cameras are illustratively described in the Manual of Photogrammetry, Third Edition (1966), pages 145–146, as well as in West German published patent application OS No. 1,772,429. However, in such cameras, film transport in the image plane is not parallel to the direction of flight but is, rather, transverse to the direction of flight. Accordingly, in order to compensate for image motion, the lens must itself be moved transverse to its axis, thus requiring precise guidance of this camera part, which is of relatively great weight. Furthermore, panoramic cameras are not directly comparable to conventional cameras, since the panoramic camera always operates on the imaging side with a field angle α of 0, so that the term $\sin\beta' \cdot \tan\alpha$ in equation (2) plays no role.

Still further, panoramic cameras in general have the disadvantage that the film strip must be cut and spliced for stereoscopic evaluation, which means a considerable loss of time in the case of reconnaissance cameras. And the evaluation is made difficult by the fact that the involved use of rotating prisms precludes a linearly true imaging of the object.

On the other hand, in aerial photographic systems known as strip cameras (also known as "continuous strip cameras", or "Sonne cameras"), the film travels parallel to the flight direction. Film-transport speed is maintained at a value proportional to $V_F/h$, while the film is continuously exposed in a narrow strip-shaped region which extends transversely to the flight direction. Such camera systems, as described, for example, in U.S. Pat. Nos. 2,413,349 and 3,163,098, are, however, suitable only for vertically downward observation. There is therefore no problem of adapting film speed to image motion, as a function of the angle of roll or tilt.

It is further known that continuous-strip cameras do not provide a picture that is capable of stereoscopic evaluation, since there is no overlap. Still further, aircraft roll produces strong distortions of the picture transverse to the direction of film transport.

British Pat. No, 885,690 describes an aerial-camera system with central-shutter cameras which are swingable or swung with respect to the vertical. Image-motion compensation is effected by moving the entire camera during the exposure, in accordance with a signal proportional to $\cos\beta' \cdot V_F/h$. Fine FMC correction as a function of field angle α is not effected in this camera.

In the camera known as KRb6/24, film-transport is in the flight direction, and a slotted shutter continuously travels transverse to the direction of film transport. To compensate for image motion in this camera, film-transport speed is controlled in accordance with Equation (1) above, modified by a superposed correctional movement which is dependent on field angle. The correction on the film drive is via a differential interposed between the film-drive roll and the drive motor, which rotates proportionally to V/h. The magnitude of this correction movement is adjustable, via lever mechanism, to the pre-set tilt angle β and is produced by an eccentric which is so coupled to the shutter drive as to produce a movement which approximates the speed profile of image motion during the exposure.

A first disadvantage of this technique of image-motion compensation is the necessarily considerable expense for precision mechanical parts such as differential, lever transmission, eccentric, etc. Moreover, the described fine correction for image-motion compensation is not satisfactory, since errors occur as a result of gear play and torsion of the transmission shafts. A further source of error lies in the lack of constancy of the speed of the continuously running shutter; this affects image-motion compensation, since the corrective motion of the eccentric is derived from shutter speed.

Furthermore, use of the eccentric restricts camera use to a single speed profile which is adapted to the involved camera lens. A change in the lens configuration, as for example, replacement of a single lens by a so-called multi-lens arrangement consisting of a plurality of lenses of different axial inclination associated with the same shutter, requires the provision of a completely different speed profile. The lever transmission permits only the pre-establishment of a constant tilt angle $\beta$. And it is not for this known mechanical correction mechanism readily possible to take into account the continuously varying roll angle $\omega$ of the aircraft.

Finally, continuously adjustable frame rates cannot be obtained with a continuously running shutter; such frame rates are possible only with a shutter characterized by start-stop action.

BRIEF STATEMENT OF THE INVENTION

The object of the present invention is to provide an improved method of compensating for image motion in an aerial camera in which a shutter slot travels transverse to the direction of film-transport, and in which film-transport is parallel to the direction of flight. The method contemplates image-motion compensation as a function of field angle, using a moving-slot or focal-plane shutter which is intermittently operated with start-stop action.

The invention achieves this object by continuously monitoring the position of the slot in the course of the exposure and by driving the film-transport motor with a control signal derived from instantaneous slot position.

In the time between two such exposures, it is advantageous to compute a slot-speed profile as a function of desired slot position, using a function associated with the involved lens configuration and the values for V/h, f and $\beta'$, and to coordinate this computed speed profile with the instantaneous value of the slot-position signal measured in the course of the next-succeeding exposure.

The main component of this computing unit can illustratively be a microprocessor.

In practicing the invention, the shutter drive and the film drive are mechanically decoupled from each other. Inertial masses in the film drive therefore do not affect shutter movement.

Finally, the invention lends itself to enhanced precision of image-motion compensation by continuous corrective consideration of the instantaneous roll-angle condition of the aircraft.

Apparatus to perform the method of the invention is characterized by a computing unit having input-data lines for the input of instantaneous values for V/h, $\beta'$, and f, and for the input of instantaneous slot position, the latter being available from a position indicator which is coupled to the slotted shutter. The output signal of this position signal serves for fine correction of film-transport motion as a function of the instantaneous position of the slot.

Preferably, a plurality of base functions are stored in the computer unit; these stored functions provide a basis from which slot position is converted into the corresponding film-transport speed.

The computing unit is also connected with a code transmitter for the input of data relevant to the involved camera-lens configuration. This measure adapts the speed profile necessary for image-motion compensation to the specific lens configuration used, and such adaptation is achieved without requiring any changes in the drive mechanism of the camera. The code transmitter is preferably arranged on the lens mount, whereby automatic switching of lens-code entry into computer storage is possible, upon a change of lenses.

The width of the slot of the camera shutter is, as a rule, variable for adaptation to the lighting conditions at the time of the photograph. In order that image-motion compensation is not distorted by changes in slot width, it is advisable that the width of the slot be controlled by an automatic exposure control which is coupled with the computing unit and that the control signal for the film transport be generated with reference to the center position of the slot.

Thus, it is not necessary to so devise the position indicator as to always provide an output signal which truly reflects the instantaneous center position of the slot. Rather, the position indicator may merely be coupled directly with one of the two curtains of the shutter and, accordingly, deliver a signal which reflects the instantaneous position of the edge of the slot, this slot-edge signal being corrected in the computing-unit, in accordance with the signal output of the automatic exposure control.

It will be understood that, in addition to compensation motion in the film drive, to compensate for image motion, the film must also be driven to effect a film advance between successive exposures. If high frame rates are to be obtained, then the film advance must be as rapid as possible. The film is therefore subjected to continuously changing forces of acceleration and deceleration, and image-motion compensation makes it necessary to maintain as precise as possible control of film speed within the exposure cycle. Accordingly, it is desirable to employ buffer-storage means, comprising two interconnected guide rollers which are displaceable in the direction of film transport, the buffer-storage means being between a drive for film transport in the image plane and the film-spool motor-drive, so that inertial reaction to the film-transport drive can be kept as small as possible. The buffer-storage means may illustratively be of the construction described in West German Pat. No. 2,736,611.

DETAILED DESCRIPTION

The invention will be further described in detail in conjunction with the accompanying drawings, in which.

Figure 1:
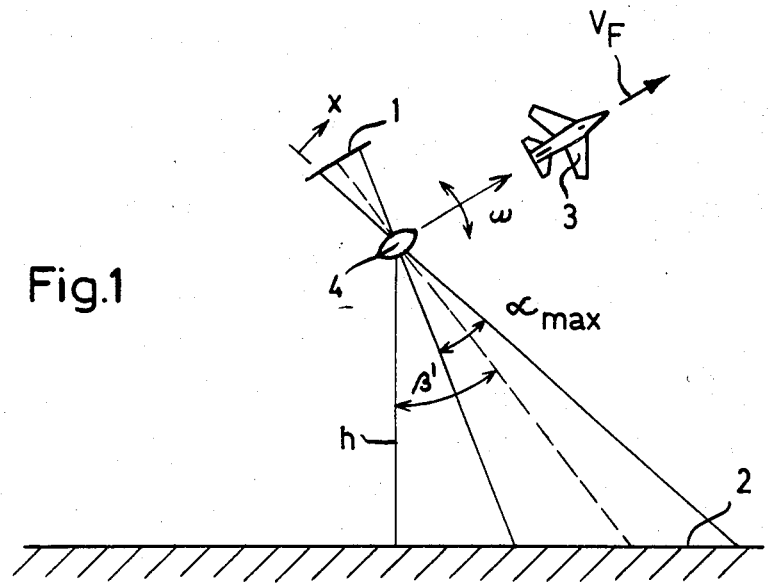
FIG. 1 is a sketch showing image-forming conditions in an aerial-photographic flight.

FIG. 1 has already been discussed to explain the parameters which influence image-motion speed $V_B$ in an aerial-camera system. Therefore, description of the invention will commence with the illustrative embodiment of FIGS. 4 and 5.

Figure 4:
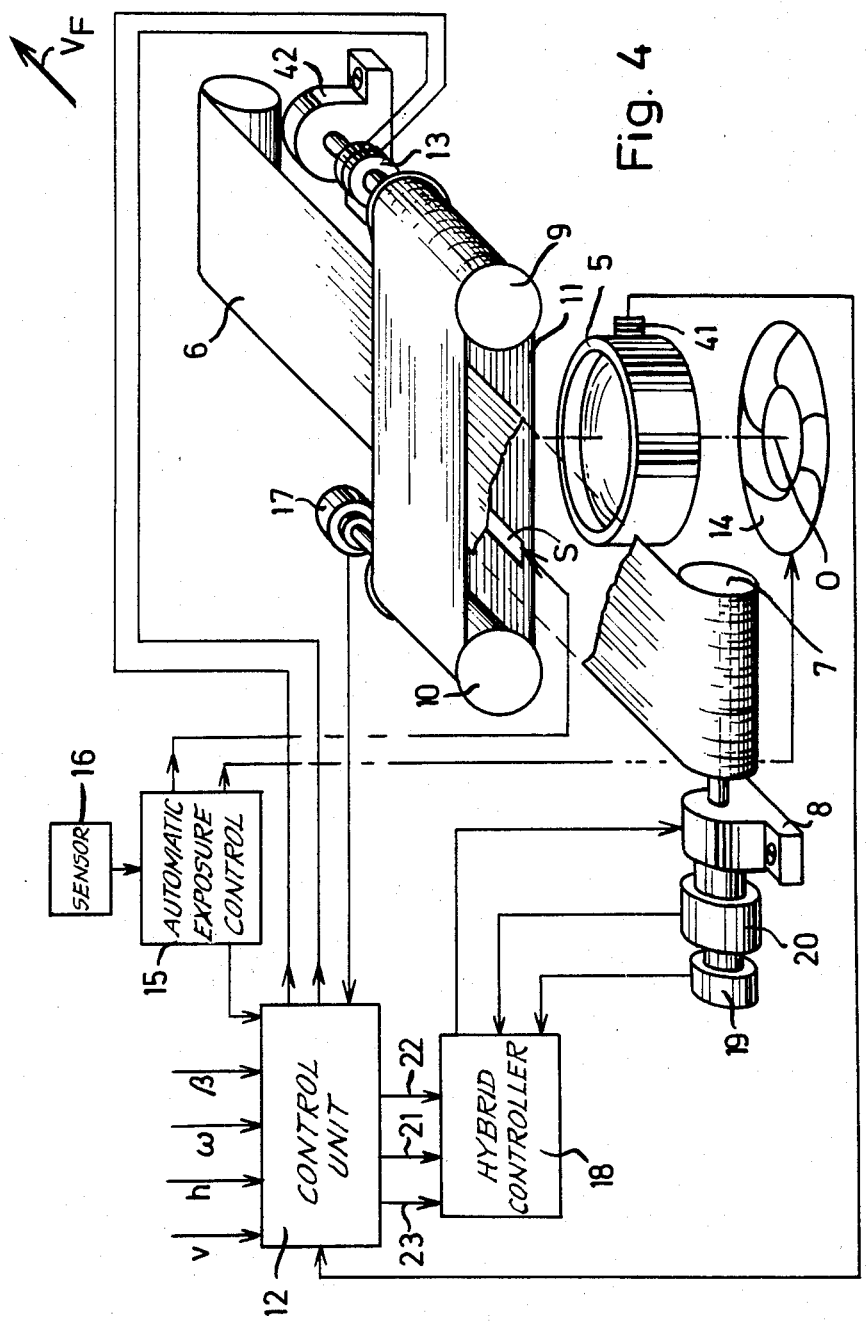
FIG. 4 is a diagram of an embodiment of the invention with a simplified isometric showing of mechanical components and a schematic showing of electrical components.

In FIG. 4, the photographic lens 5 of an aerial camera will be understood to be so installed in an aircraft that the direction of transport of film 6 behind the lens 5 is parallel to the flight direction, indicated by an arrow $V_F$. The drive of film 6 in the image plane is effected by a transport roller 7, which is driven by a motor 8.

A slot-type shutter is interposed between lens 5 and film 6. This shutter is shown in simplified form as an endless belt 11 over spaced rollers 9 and 10, and shutter action is effected through a slot S of constant width; it will be understood that the shutter slot S is of adjustable width and that it comprises two curtains, each of which defines a different edge of the slot. Such a shutter requires no further detailed description.

The slot width $\Delta S$, and thus exposure time, as well as the aperture of a diaphragm 14 in front of lens 5, are controlled by automatic exposure-control means 15, in accordance with the signal output of a photosensitive sensor 16. Shutter 11 is actuated by a control unit 12 which controls frame rate in accordance with a preselected overlap, with due consideration of instantaneous flight speed $V_F$ and flight altitude h; control unit 12 cyclically connects the drive roller 9, via a clutch 13, to a motor 42 which rotates at constant speed and then, after the exposure, disconnects and brakes roller 9. Control unit 12 will be understood to further contain a computer which calculates image-motion speed $V_B$ according to Equation (2), from the $V_F/h$ signal used for control of frame overlap, from a signal which is proportional to the instantaneous roll angle $\omega$ of the aircraft, and from a signal indicative of the preset tilt inclination $\beta$ of the camera. In addition, the instantaneous field angle $\alpha$ at the time of the exposure also enters into this calculation, predicated on the relationship $\tan\alpha = x/f$, where x is the instantaneous position of the slot S. For this purpose, roller 10 is coupled with a position indicator (encoder) 17 which supplies a signal proportional to the instantaneous position x of slot S.

In order to adjust film-transport speed to the desired value, determined by the computer of unit 12 in accordance with Equation (2), a hybrid controller 18 compares the desired value (present on a line 22) with the output signal of a tachometer generator 19 (coupled to the film-transport roller 7) and thus develops a control signal; this control signal, obtained from the comparison of desired (22) and actual (19) values, is supplied for control of the film-drive motor 8.

The hybrid controller 18 additionally controls film advance between successive exposures. For this purpose, a position indicator 20 is disposed on the shaft of the film-transport roller 7. The signal from this position indicator 20 is compared by the hybrid controller 18 with a desired value (present on a line 23), said value being proportional to the image size of the lens used. The signal present on the line 23 is generated by a code transmitter 41 at the mount for lens 5 and is fed via the computer of unit 12 to the hybrid controller 18.

Figure 5:
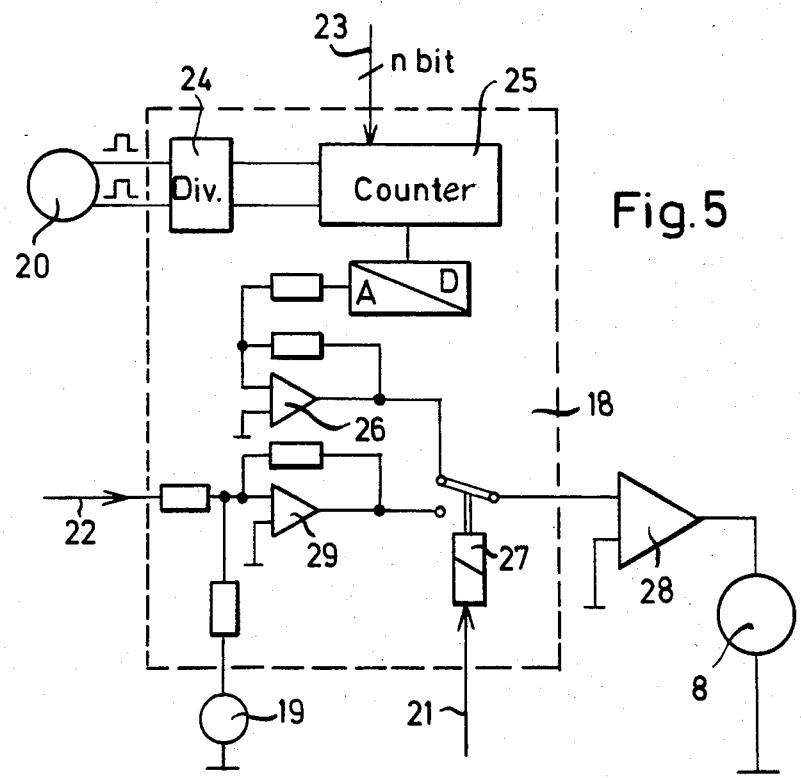
FIG. 5 is a more detailed block diagram of the controller 18 of FIG. 4.

FIG. 5 shows the hybrid controller 18 in detail. It contains a direction discriminator 24, in which the rotary direction of position indicator 20 is recognized, followed by a counter 25 for the addition/subtraction of pulses from the incremental position indicator 20. A digital-analog converter is connected to the output of counter 25. This converter delivers an analog output signal which is proportional to the position of the transport roller 7 and which is amplified in a control amplifier 26 and fed via a switch 27 to the power amplifier 28 of motor 8. For purposes of terminating a frame-to-frame advance of the film, counter 25 will have been digitally loaded, via input 23, with a digital setting which corresponds to a predetermined overlap fraction related to the lateral dimension of a frame (image size), and the film-advance motor 8 comes to a stop when position indicator 20 reports that the count of measured film advance has reached the amount preset at 23.

A second operational amplifier 29 can also be connected to the power amplifier 28 via switch 27. This operational amplifier 29 effects a comparison between the desired and actual values between the signal on line 22 and the output signal of the tachometer generator 19. The switching is effected by the computer of control unit 12, via a signal on line 21, which signal is synchronized with the frame rate.

Figure 7:
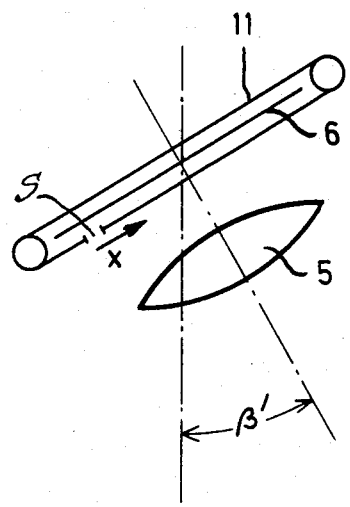

If the axis of the camera of FIG. 4 is inclined at an angle $\beta'$ to the vertical, as shown in FIG. 7, for instance as a result of the rolling movement of the aircraft carrying the camera, then the image-motion speed in the plane of the film 6 is given in accordance with Equation (2) as:

$$V_B = \frac{V_F \cdot f}{h} \cos\beta' - \frac{V_F}{h} \sin\beta' \cdot x \qquad (3)$$

if one employs the relationship $x = f \cdot \tan\alpha$, where x represents the instantaneous position of the slot. Assuming that $V_F$, h and $\beta'$ do not change during the exposure, $V_B$ is dependent only on the field angle $\alpha$ and has the course indicated by dashed line A in FIG. 8.

Figure 6:
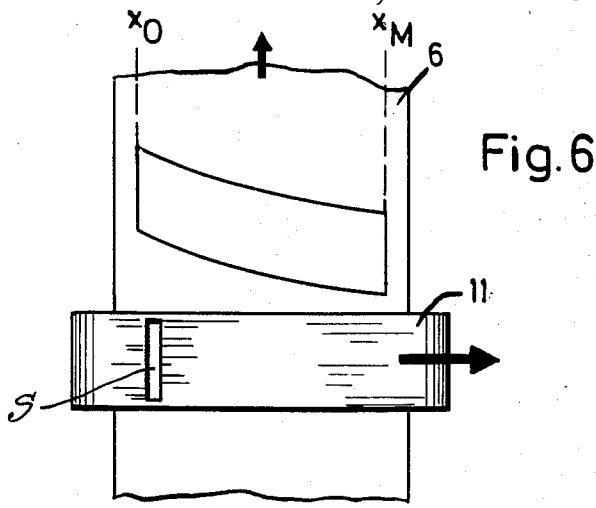
FIGS. 6 and 7 are simplified diagrams corresponding to FIGS. 3 and 2, respectively, and serving to explain image motion in the case of a single-lens camera in the circumstance of aircraft roll or camera-axis tilt.

In compensating for image motion, motor 8 moves the film 6 at speed $V_T(x) = V_B$ which is dependent on instantaneous slot position in accordance with Equation (3), slot position being continuously tracked by encoder 17. The normally rectangular image mask develops onto the film 6 with boundary lines of parabolic shape extending transverse to the flight direction, thus having the distorted shape shown with exaggeration in FIG. 6; however, the picture content itself is free of motional blur and distortion, since there is no relative movement between picture and film in the described angle-dependent image-motion compensation.

Figure 3:
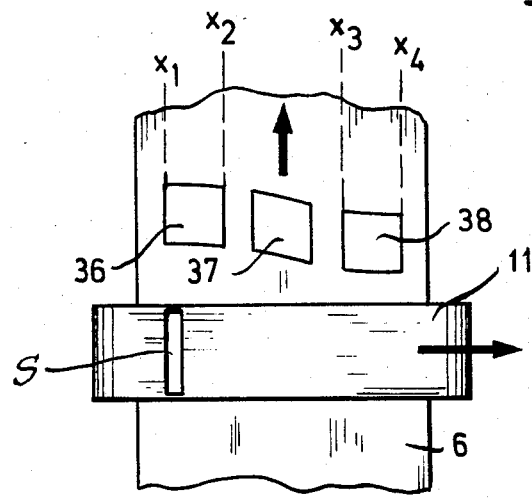
FIGS. 2 and 3 are simplified diagrams serving to explain image motion wherein the camera-lens system involves multiple lenses, FIG. 2 being in the vertical plane which is transverse to the flight-velocity vector, and FIG. 3 being a view in the horizontal plane designated III—III in FIG. 2.
Figure 2:
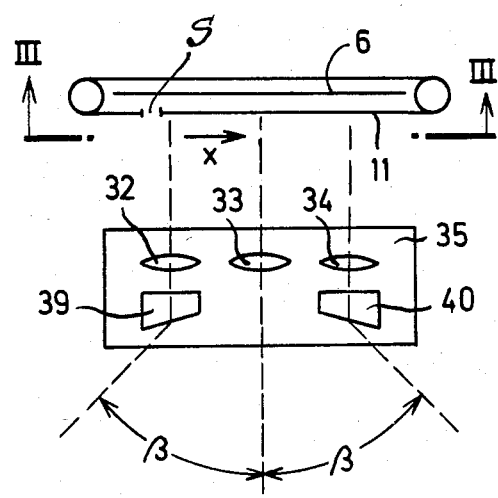

The single lens 5 can be replaced by the multiple-lens configuration 35 shown in FIG. 2. The configuration 35 contains three individual lenses 32, 33, 34 positioned alongside each other on a line perpendicular to the flight direction, and the optical axes of the two outermost lenses 32 and 34 are inclined to the vertical by prisms 39 and 40 in front of the involved lenses. The same focal-plane shutter successively scans the individual image fields of these three lenses. By reference to Equation (3), it becomes clear that, in the image fields 36, 37 and 38 shown in FIG. 3 to be associated with the respective individual lenses 32, 33 and 34, different image-motion speeds are present since the two outermost lenses 32 and 34 have opposite inclination angles $\beta$, for which roll-sensitive motions are differently additive. The direction of view of the central lens 33, on the other hand, is parallel to the vertical; thus, in the corresponding image field 37, $\omega = 0$, and image-motion speed is constant.

Figure 8:
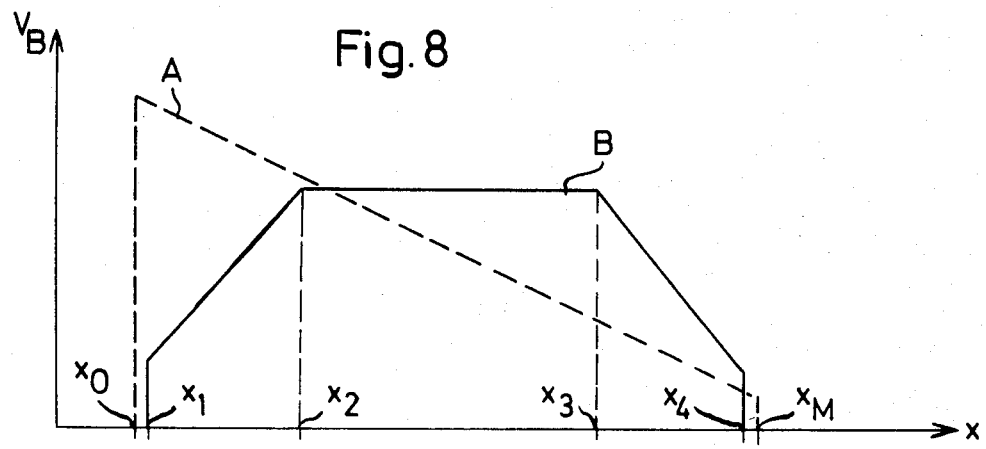
FIG. 8 is a graph of image-motion speed $V_B$ as a function of shutter position x, for the respective arrangements of FIGS. 2/3 and FIGS. 6/7.

The image-motion speed profile which corresponds to lens arrangement 35 is shown by curve B in FIG. 8. This curve B is described by the position of image boundaries $x_1$, $x_2$, $x_3$ and $x_4$, by the constant height of the section between $x_2$ and $x_3$, and by opposite slopes of the sections between points $x_1$ and $x_2$, and between points $x_3$ and $x_4$, respectively. While $x_1$, $x_2$, $x_3$ and $x_4$ are constants specific to the lens system 35, the slope and amplitude of profile B accord with Equation (3), for applicable values of $V_F$, h, $\omega$ and $\beta$. The base functions corresponding to curves A and B are stored in the computer of unit 12 of the device shown in FIG. 4 and will be called up by the signal code reader 41 when a lens change is made. The speed profile for image-motion compensation will be recalculated for each exposure (during the time between two successive exposures) by input of instantaneous values for V/h and $\omega$, into the respective lens-dependent ground function, these values being continuously measured in the course of photographic flight. Based on this speed profile, the film drive 7, 8 is controlled at speed $V_T = V_B$ as a function of the instantaneous position of slot S during the exposure.

What is claimed is:

1. A method of compensating for image motion in an aerial camera in which a slotted shutter (11) moves transverse to the direction of film (6) transport and in which film transport is parallel to the direction of flight, and further in which film-transport speed $V_T$ in the image plane is controlled as a function of the ratio of the speed of flight $V_F$ to the altitude h, the focal length f of the camera lens, and the inclination $\beta'$ of the camera, characterized by the fact that the position (x) of the shutter slot (S) is continuously measured in the course of making an exposure, and the drive motor (8) for film transport (7) is governed by a control signal derived from the measured position (x) of the slot (S).

2. A method according to claim 1, characterized by the fact that during the time between two successive exposures a speed profile is computed to establish desired time-related positions (x) of the slot (S), the computation being pursuant to a function associated with the involved lens configuration (5, 35) and with the values of $V_F/h$, f and $\beta'$, and further characterized by the fact that during the next following exposure the signal which is proportional to the measured position of the slot is fed back for evaluation against the speed profile to derive the control signal to the drive motor (8).

3. A device for carrying out the method of claim 1, characterized by a computing unit (12) for controlling film-transport speed $V_T$, which unit is connected (a) with data lines for inputting the instantaneous values for $V_F/h$, $\beta'$ and f and (b) with the output of a position indicator (17) which is coupled to the slotted shutter (11), the signal from said position indicator serving for the fine correction of the film-transport movement as a function of the instantaneous position (x) of the slot.

4. A device according to claim 3, characterized by the fact that within the computing unit (12) there are stored a plurality of basic lens-related functions on the basis of which the position (x) of the slot is converted into the corresponding film-transport speed $V_T$ and that the computing unit (12) is connected to a code transmitter (41) for the inputting of lens data unique to the lens configuration (5, 35) used.

5. A device according to claim 4, characterized by the fact that the code transmitter (41) is arranged on the mount of the lens (5).

6. A device according to claim 3, characterized by the fact that the width of the slot (S) is controlled by an automatic exposure control (15) which is coupled to the computing unit (12) and that the control signal for film transport is effected with reference to the position of the center of the slot.

7. A device according to claim 3, characterized by the fact that the slotted shutter is connected to a motor (42) operating at constant speed and via a coupling (13) which is controlled by the computing unit (12).

8. A device according to claim 3, characterized by the fact that the film transport (7) is coupled to a position indicator (20) and a tachometer generator (19), and that a hybrid controller (18) is provided which, controlled by the computing unit (12), effects a frame-indexing position control of film advance in the interval between exposures and which effects a speed control of film transport (7) throughout the course of making an exposure.

9. In an aerial camera system having a lens establishing a terrain image in a focal plane of film support, film-transport means for advancing film in said plane in a direction parallel to the direction of flight, and a focal-plane shutter including drive means for effecting successive film exposures through shutter-slot motion transverse to the flight direction, the improvement in which transducer means is provided to track shutter-slot motion and to deliver an output-signal indicative of instantaneous position of the shutter slot in its shutter-exposure cycle, and in which said film-transport means includes control means connected for response to said output signal.

10. The camera system of claim 9, in which the drive means for said shutter is intermittently operative, with a dwell interval between successive shutter operations, computer means having inputs for instantaneous values of V/h, f and $\beta'$ and adapted to said dwell interval to compute a slot-speed profile related to the image field of said lens, and means coordinating the application of said slot-speed profile to said shutter-drive means in accordance with the instantaneous value of the output signal indicative of shutter-slot position.

11. The camera system of claim 9, in which said lens is one of a plurality of lenses on different optical axes inclined laterally with respect to the vertical, said lenses being positioned to establish separate images at laterally spaced regions of said film, and said shutter having a cycle of operation which successively scans the respective images of said lenses.

* * * * *